United States Patent [19]
Wehrmeister

[11] Patent Number: 5,142,766
[45] Date of Patent: Sep. 1, 1992

[54] TOOL EXCHANGER FOR PROGRAMMED-CONTROLLED MACHINE TOOLS

[75] Inventor: Gerhard Wehrmeister, Kempten, Fed. Rep. of Germany

[73] Assignee: MAHO Aktiengesellschaft, Fed. Rep. of Germany

[21] Appl. No.: 521,329

[22] Filed: May 9, 1990

[30] Foreign Application Priority Data

May 9, 1989 [DE] Fed. Rep. of Germany ....... 8905795

[51] Int. Cl.⁵ .............................................. B23Q 3/157
[52] U.S. Cl. ...................... 483/15; 294/116; 414/736
[58] Field of Search .................. 29/568; 414/226, 735, 414/736, 738; 294/116

[56] References Cited

U.S. PATENT DOCUMENTS

| | | | |
|---|---|---|---|
| 3,286,344 | 11/1966 | Brainard et al. | 29/568 |
| 3,886,652 | 6/1975 | Roublott et al. | 29/568 |
| 3,990,140 | 11/1976 | Polacek et al. | 29/568 |
| 4,190,947 | 3/1980 | Sato et al. | 29/568 |
| 4,759,115 | 7/1988 | Kielma | 29/568 |
| 4,878,705 | 11/1989 | Arnquist | 294/116 |
| 4,879,802 | 11/1989 | Winkler et al. | 29/568 |

FOREIGN PATENT DOCUMENTS

| | | |
|---|---|---|
| 1477501 | 3/1974 | Fed. Rep. of Germany . |
| 3017613 | 11/1981 | Fed. Rep. of Germany . |
| 3042768 | 8/1982 | Fed. Rep. of Germany . |
| 0268184 | 5/1989 | German Democratic Rep. ... 29/568 |

Primary Examiner—Z. R. Bilinsky
Attorney, Agent, or Firm—Baker, Maxham, Jester & Meador

[57] ABSTRACT

A tool exchanger for programmed machine tools includes a device for the conveyance of selected tools between a tool room and a main spindle of the machine tool and with two grip devices moving along a prescribed rotation angle and arranged in a carrier support mounted to the conveyance device and able to rotate between an alternate position and at least one standby position. In order to achieve faster exchange operations of the tools in a horizontal and vertical machining spindle, the drives to open and close both tool grips are activated at the same time. The support mounted includes a locking device which blocks the tool grip to standby position in its closed condition.

39 Claims, 6 Drawing Sheets

TOOL EXCHANGER FOR PROGRAMMED-CONTROLLED MACHINE TOOLS

FIELD OF THE INVENTION

The invention concerns a tool exchanger for programmed machine tools with a device for the conveyance of selected tools between a tool room and a main spindle of the machine tool, and with two grip devices moving along a prescribed rotation angle and arranged in a carrier support mounted to the conveyance device and able to rotate between an alternate position and at least one standby position.

BACKGROUND OF THE INVENTION

The use of double grips in tool exchange systems enables tools to be exchanged in a single conveyance step between a tool room and the machining spindle. They clearly result in reduced tool exchange times compared to those of single grips since these must first deposit the old tool to the main spindle.

German patent publication 1 477 501 describes a tool exchanger for a machine tool with a horizontal spindle featuring two diametrically opposed tool grips which can be rotated 180° so that the selection of a new tool from the tool room and the conveyance of the tool in a spindle-close standby position may take place during the machining time with the previous tool. A significant disadvantage of this embodiment lies in the fact that each tool grip must have its very own independent activation device, which results in a very expensive and bulky construction in connection with the large rotation angle.

German patent publication 30 17 613 describes another tool exchanger for machine tools with a spindle arranged along a rotating angle head, featuring a double gripping device arranged to rotate along a conveyance arm in order to serve one machining spindle or the other. The conveyance arm can be moved parallel to and perpendicularly to the spindle axis and can be rotated along another axis. The mechanisms which are required to operate the machining spindle in the various rotation positions of the angle head are technically complex and require significant space.

SUMMARY OF THE INVENTION

The present invention concerns a tool exchanger for program-controlled machine tools with two movable tool gripping devices which enables a faster tool exchange at a horizontal or vertical machining spindle, and which requires limited space for its simple design. To that end, there are provided driving mechanisms for the simultaneous opening and closing of both tool grips, and a carrier support with a locking device which locks the tool grips in a standby position when closed.

The locking device includes a connection between a piston rod of a hydraulic cylinder and a final control element which enables the locking action to be maintained on the tool grips in the standby position despite a hydraulic activation toward opening and despite the resulting movement of the piston rod. As a result, there is required only a single pressure medium input in the form of bores and belt canals, which ensures low maintenance, failure-free operation and simplified manufacturing.

In one aspect of the invention, a hydraulic cylinder provides a drive medium for each tool grip. The cylinders are connected to a common pressure input, thus resulting in a simple and space-efficient channel guide.

In a further aspect of the invention, the tool grips are locked in the standby position through a spring-loaded locking bolt which presses the slanted locking surfaces laterally at the final control element against locking attachments on the tool grip so that a wedging effect occurs and locking takes place.

In a still further aspect of the invention, both tool grips are arranged along a sharp angle to one another and feature a short rotating arm length in relation to the rotating axis. This results in a faster tool exchange in that the forces affecting the conveyance device during the tool exchange as a result of mass acceleration and deceleration are limited.

BRIEF DESCRIPTION OF THE DRAWING

Further embodiments and advantages of the invention will be apparent from consideration of the detailed description hereinafter set forth, as well as the drawing in which.

DETAILED DESCRIPTION OF THE PREFERRED EMBODIMENTS

Figure 1:
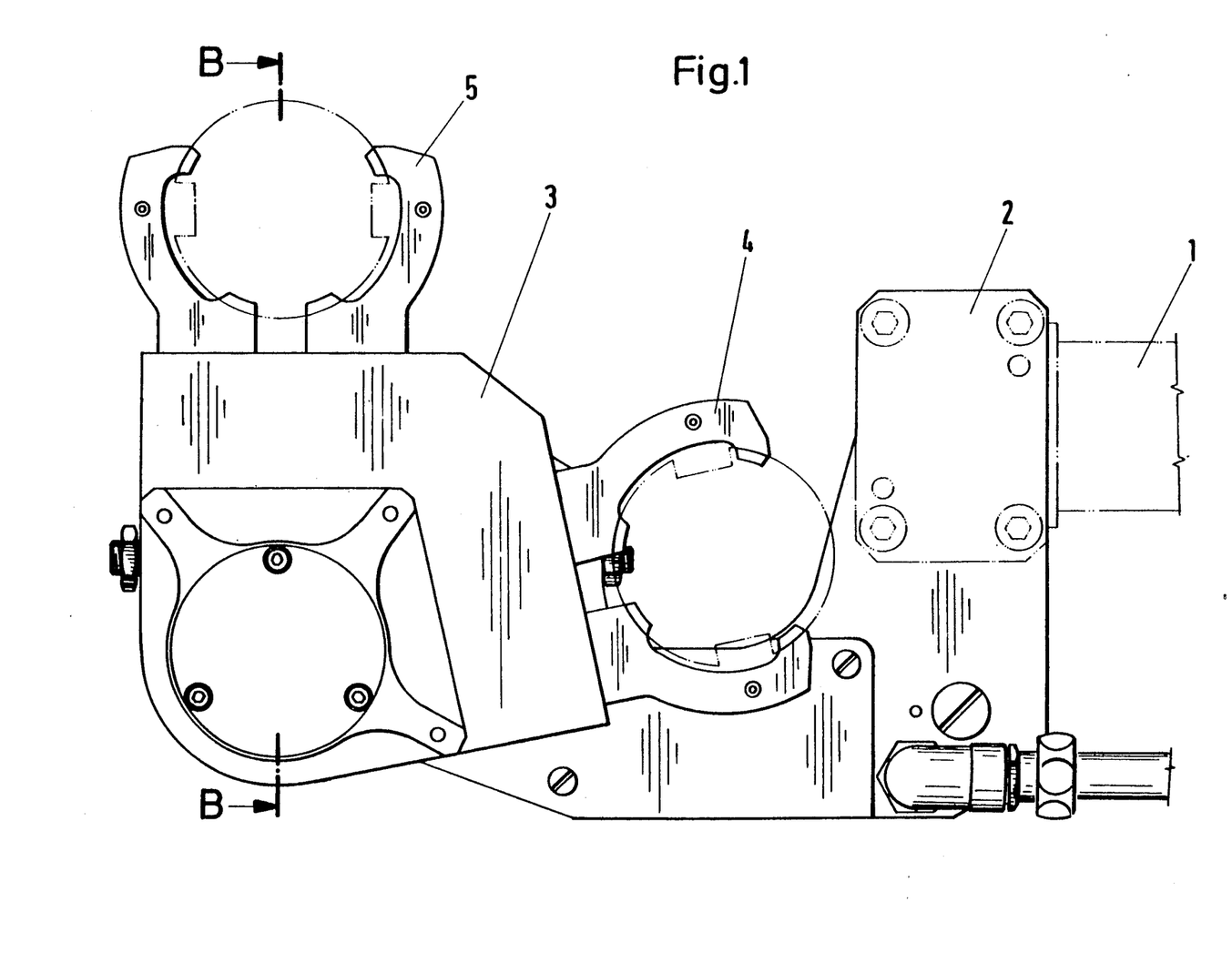
FIG. 1 is a top plan view of a support mounted to the support arm of a tool exchanger and the support mount with the tool grips arranged therein.

The tool exchanger in accordance with FIG. 1 comprises a rotating plate-shaped support 2 mounted to the end of a support arm 1, a carrier support mount 3 attached to its bottom, as well as two tool grips 4., 5 arranged along a sharp angle. The support arm 1 is part of a conveyance device which executes a movement in several axes between the intermediate station of a tool room and the horizontal or vertical spindle of a tool. The support mount 3 is arranged on a bolt (121) affixed to the support 2 (see FIG. 5).

Figure 2:
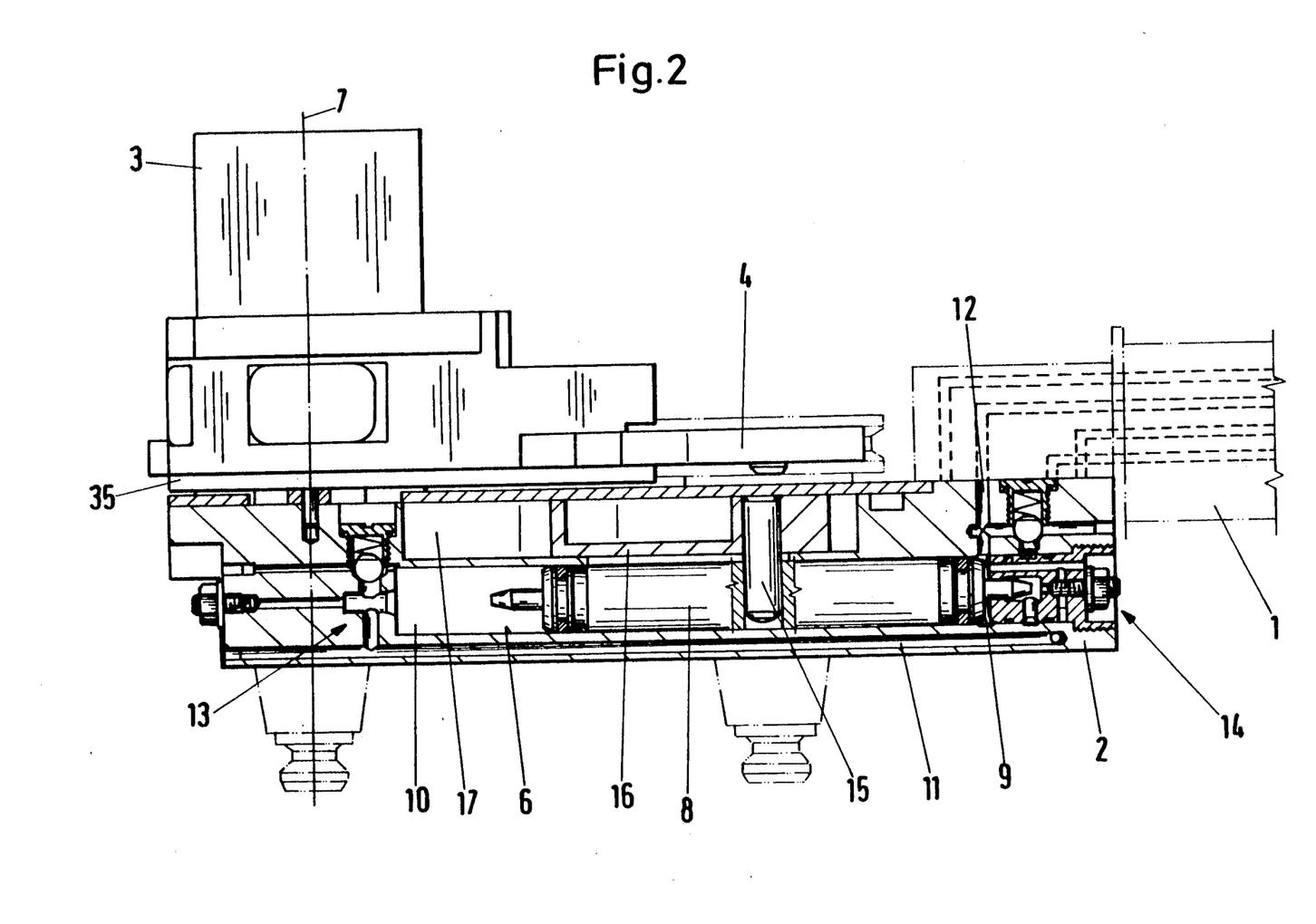
FIG. 2 is a sectional lateral view of the support and the support mount in accordance with FIG. 1.
Figure 3:
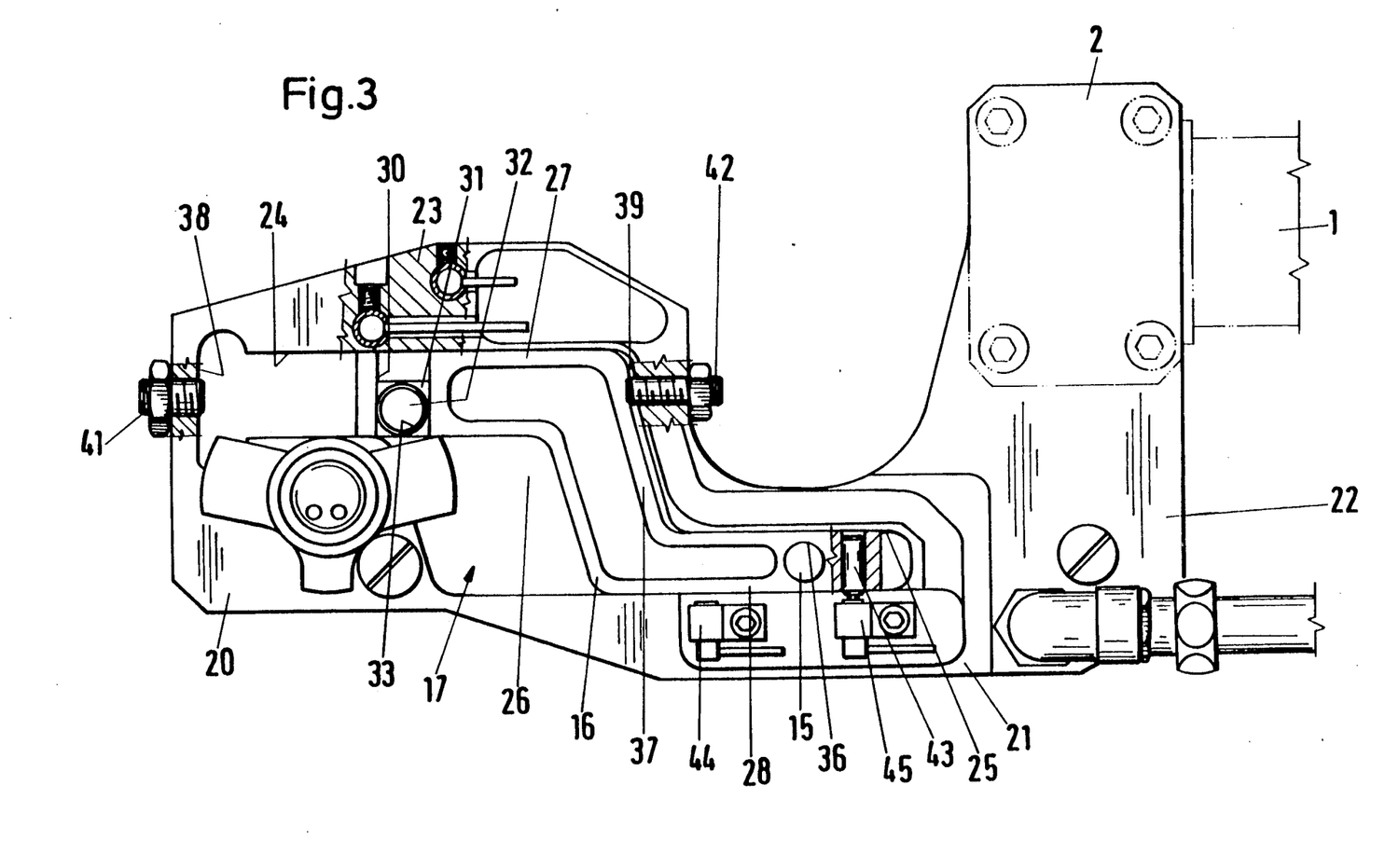
FIG. 3 is a top view of the support mount in accordance with FIG. 1.

As shown in FIG. 2 in particular, a hydraulic cylinder 6 is arranged in the lower part of the support 2 whose longitudinal axis runs perpendicular to the rotating axis 7 of the support mount 3. The supply of a pressure medium to the working chambers 9, 10 arranged to the right and left of a piston rod 8 is through bores 11, 12, which are arranged in the support 2. On both sides of the hydraulic cylinder 6 is a limit damper 13, 14. A cross pin 15 attached in the middle of the piston rod 8 is connected at its free end to an angle slide 16 which is arranged above the hydraulic cylinder 6 in a receptacle 17 of the support 2 and which can be moved longitudinally. As shown in FIG. 3, the support 2 comprises a wider front area 20, a narrow center area 21 and an angular rear area connected to the end of the support arm 1. The receptacle 17 for the angle slide 16 is hollow on the side of the support housing 23 turned toward the support mount 3. This receptacle 17 features a first guiding groove 24 and a second guiding groove 25 arranged in the narrow central area 21 and parallel to the first guiding groove 24. Both guiding grooves 24, 25 are connected with one another through a broadened central part 26.

The angle slide 16 arranged in the recess 17 is guided in the guiding grooves 24, 25 through two parallel guiding arms 27, 28. The guiding arm 27, with axial moving capability in the first guiding groove 24, features at its end a groove 30 oriented perpendicularly to the sliding direction and containing a guide ring 31. The guide ring 31 features a central bore 33 which engages an adjusting pin 32 displaced in relation to the rotating axis 7 and arranged on a cover 35 affixed to the support mount 3 (see FIG. 5). The second guiding arm 28 is guided in the second guiding groove 25 and has a bore 36 which engages the transverse pin 15 connected to the piston rod 8. Both guiding arms 27, 28 of the angle slide 16 are connected with one another through a cross bar 37. On the front ends 38, 39 of the first guiding groove 24 are two setscrews 41, 42 in the support housing 23 which enable the limit positions of the angle slide 16 to be set. A tripping pin 43 arranged on the side at the end of the lower guiding arm 28 activates a switch 44, 45 in the respective end position.

Figure 4:
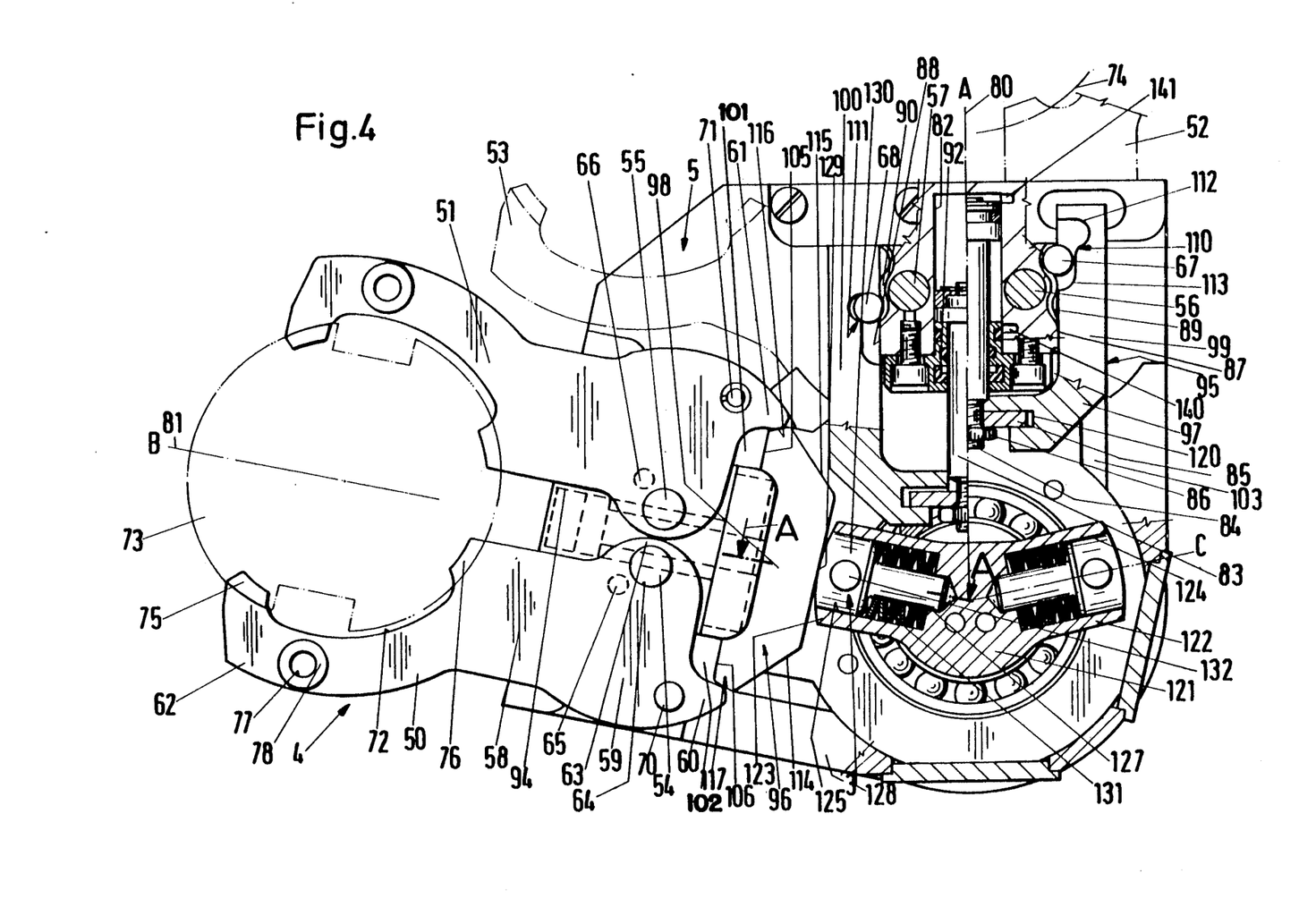
FIG. 4 is a sectional top view of the support in accordance with FIG. 1 showing both tool grips.

As shown in FIG. 4, both tool grips 4, 5 at an angle of about 80° are mounted with two grip arms 50 to 53 each. Each grip arm 50 to 53 rotates around a fixed hinge pin 54 to 57 at the support mount 3. A specific tool exchange position A and a standby position B or C at a rotating angle to the right or to the left are intended for each tool grip 4, 5. The dotted line in FIG. 4 shows the tool grip 5 in the exchange position, the solid line represents the tool grip 4 in the standby position B.

The arrangement of the grip arms 50 to 53 is identical. Each grip arm has a middle section 58 with two lateral faces which are parallel to each other, an arc-shaped rear section 59 which widens to both sides with a locking attachment 60 at its outer edge and a narrow front section 62 in the form of a ring segment. In a semicircular face attachment 63 of the rear section 59, and turned toward the second grip arm, is a bore 64 which engages the hinge pin 54 attached to the support mount 3. An activating pin 65 looking downward and moving radially in the direction of the middle section 58 is arranged next to the bore 64 on the bottom of the grip arm 50. A switching pin 70 pointing up is attached in the rear section 59 in the area of the locking attachment 60. The radius of the inside 72 of the ring segment-shaped front section 62 corresponds to the radius of the tool recess 73. At the ends of the front section 62, two wedge-shaped attachments 75, 76 are arranged on the inside 72, which engage a ring groove arranged at the tool recess 73 in the closing position. In addition, a centering stud 78 pointing up is mounted in a bore 77 in the front section 62.

The design of the activation mechanism of both tool grips 4, 5 is the same so that the description of the activation mechanisms for the tool grip 5 also applies to the tool grip 4. A double-action hydraulic cylinder 82 is arranged beneath the tool grip 5 in the support mount 3 in the direction of the axis 80 whose piston 83 can only accommodate in the exchange position A both end positions as represented on both sides of the axis line 80 in the cross-section of FIG. 4. At the end of the piston 83 is a threaded lug 84 to which is attached a plate 85 by means of a nut 86. Wave-like recesses 89, 90 are arranged in the area of the hinge pins 56, 57 on two side faces 87, 88 of a part of the support mount 3 forming the hydraulic cylinder 82. Sealing of the hydraulic cylinder 82 and control of the piston rod 83 is ensured with a front-end secured stop plate 92. The hydraulic cylinder 94 of identical design, and assigned to the control element 96, is shown with a dotted line in FIG. 4.

The support mount 3 further comprises a U-shaped moveable control element 95 with a cross bar 97 and two laterally tip-stretched side pieces 99, 100. Both side pieces 99, 100 can be moved longitudinally and are arranged in the support mount 3 underneath the grip arms 52, 53 in a slideway 103 parallel to the hydraulic cylinder 82. As seen when viewing cross bars 97, 98 of both activation mechanisms, each cross bar 97, 98 projects above both of its side pieces 99, 100 and 101, 102 respectively thus resulting in two shoulders 105, 106, located across from the grip arms. Each of the side pieces 99, 100 has a recess 110, 111 at its front end and open toward the inside with an arc-shaped enlarged section 112 and a second smaller section 113 along side pieces 99, 100. As shown in FIG. 4, the cross bar 97, 98 features two slanted lateral faces 114, 115 in the upper area connecting with two locking faces 116, 117 and forming an angle. In addition, the cross bar 97, 98 features a recess 120 perpendicular to the direction of travel which engages the plate 85 connected to the piston 83 with an axial tolerance (see FIG. 6).

Figure 6:
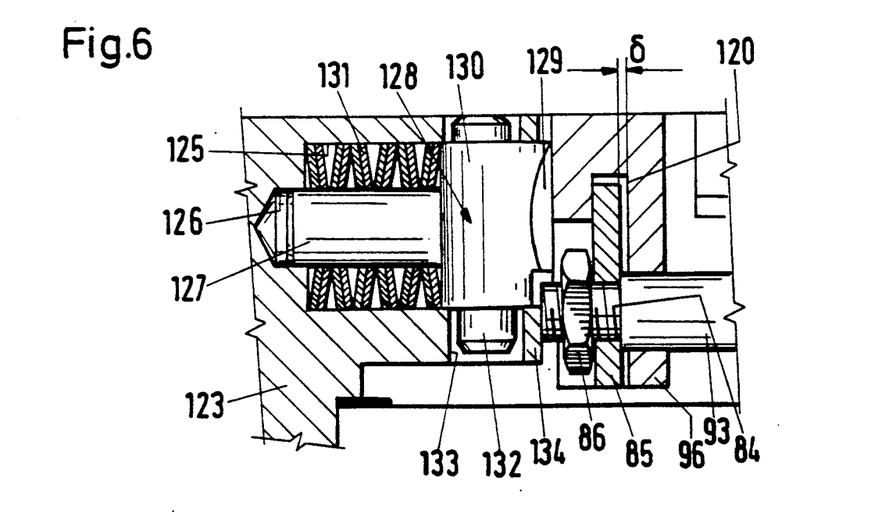
FIG. 6 is an enlarged section of the locking device taken along section A—A in FIG. 4.

As shown in FIG. 4, two attachments 122, 123 turned in the direction for the two possible standby positions B and C, and displaced against one another along the double rotating angle, are arranged at the pin 121 with bores 124, 125 oriented toward the pin center. FIG. 6 shows on the inside end of bore 125 another bore 126 with a smaller diameter which engages a pin-shaped attachment 127 of a locking pin 128. The front section 130 of the locking pin 128 with its rounded or arcuate surface 129 at its free end slides longitudinally in bore 125. A spring package 131 located in the rear part of the bore 125 presses the locking pin 128 against the face of the cross bar 98. A guide pin 132 is pressed in the front section 130 of the locking pin 128, perpendicular to the direction of displacement, which engages a cross bore 133 at the attachment 123, thus preventing the locking pin 128 from falling out during the rotation of the support mount 3. A stop 134 is arranged at the free end of the attachment 123 underneath the locking pin 128. The arrangement described for attachment 123 also applies to the attachment 122.

Figure 5:
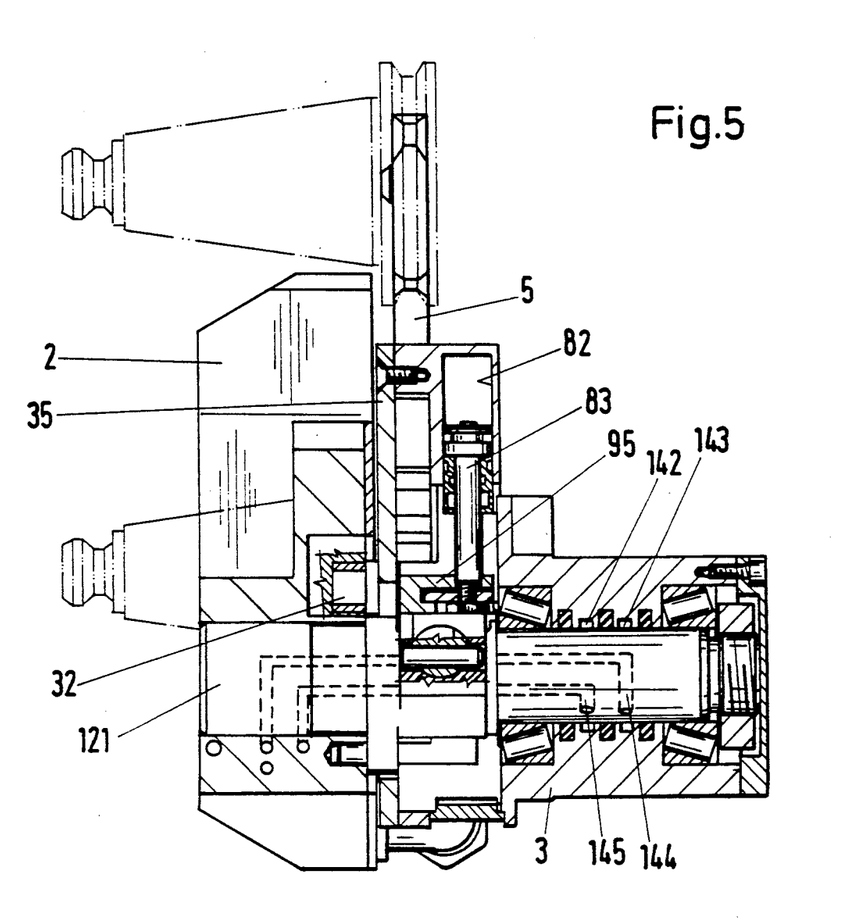
FIG. 5 is the support and support mount taken along section B—B of FIG. 1.

The pressure medium of the hydraulic cylinder 82 is supplied through bores 140, 141 arranged in the support mount 3. The bore 140 and the bore of the second hydraulic cylinder not shown in FIG. 4 are jointly connected to a first ring duct 142. The bore 141 and the corresponding bore for the second hydraulic cylinder, also not shown in FIG. 4, are jointly connected to a second ring duct 143 in the support 3. As shown in FIG. 5, two pressure medium ducts 144, 145 discharge into the ring ducts 142, 143 in the pin thus guaranteeing the supply of the pressure medium in any rotation position.

The tool exchanger described above operates as follows:

A tool exchange at the machining spindle requires that the tool grip 5 of the tool exchanger shown in FIG. 4 be completely open and centered on the machining spindle so that the tool fixture 74 held in the machining spindle can be grasped. The tool fixture 73 with the new tool previously removed from the tool room is already in this position in the tool grip 4. The secured holding of the tool fixture is achieved by a clamping action on the tool grip 4, whereby the spring-loaded locking bolt 128 presses the slanted locking faces 116, 117 at the control element 96 against the locking attachments 60, 61 at the grip arms 50, 51. Inasmuch as the grip arms 50, 51 are turned inward along the fixed hinge pins 54, 55, they exercise a clamping action on the tool fixture 73.

In order to close the tool grip 5, the hydraulic cylinder 82 is put under pressure via the ring duct 142 and the bore 145 so that a retraction of the piston rod 83 result in an axial shift of the control element 95 from the position left of the axis line shown in FIG. 4 to the right-side position. With their lateral faces, the activation pins 67, 68 arranged on the grip arms 52, 53, engage at the same time the recesses 110, 111 arranged at the side pieces 99, 100, and the wavelike recesses 89, 90 at the support mount 3. When displacing the control element 95 from the opening position shown in the left transverse section to the clamp position shown in the right transverse section, the activation pins 67, 68 complete a circular motion along the wavelike recesses 89, 90. This movement effects a rotation of the grip arms 52, 53, from the open to the closed position. At the same time, the hydraulic cylinder 94 assigned to the tool grip 4 is put under pressure in the clamping direction so that both tool grips 4, 5 are clamped at the same time before swinging the tools.

The tool exchanger returns after loosening the clamping elements for the tool fixture in the machining spindle, and the tool fixture 74 is removed from the machining spindle together with the tool.

By putting the hydraulic cylinder 8 under pressure, the angle slide 16 is displaced axially in order to rotate the support mount 3 along its rotating axis 7 whereby the tool grip 4 in standby position B moves to the tool exchange position A while the tool grip 5 goes into standby position C with the old tool. The rotation of the support mount 3 and therefore of the tool grips 4, 5, is accomplished by sliding the angle slide 16 whose upper guiding arm 27 is effectively connected to the support mount 3 via the slide ring 31 and the adjusting pin 32.

After the tool grip 4 with the new tool has been rotated in the tool exchange position A, the tool fixture 73 is inserted into the machining spindle by moving back the tool exchanger and is clamped.

The hydraulic cylinders 82, 94 of both tool grips 4, 5 are put under pressure at the same time through the ring duct and the bore in the direction of opening in order to open the tool grip 4 in the tool exchange position A.

When the hydraulic cylinder of the tool grip 5 in standby position is put under pressure in the direction of opening, the piston rod end within the clearance between the plate 85 and the recess 120 in the control element 95 travels against the stop 134 arranged at the attachment 123 underneath the locking bolt 128. Since the threaded lug 84 already makes contact with the stop 134 before the tolerance $\delta$ is overcome, the control element 96 is not moved by the piston 83 so that the spring-loaded locking pin 128 continues to press against the control element 95, thus maintaining the clamping action. The grip arms 50, 51 of the tool grip 4, now in exchange position A, are opened at the same time. A complete opening of the tool grip is made possible by the described outer contour of the tool grips whereby the ends of the tool grips are aligned with the closing edge of the support mount. This prevents collisions with pieces to be machined or with machine parts.

Figure 7:
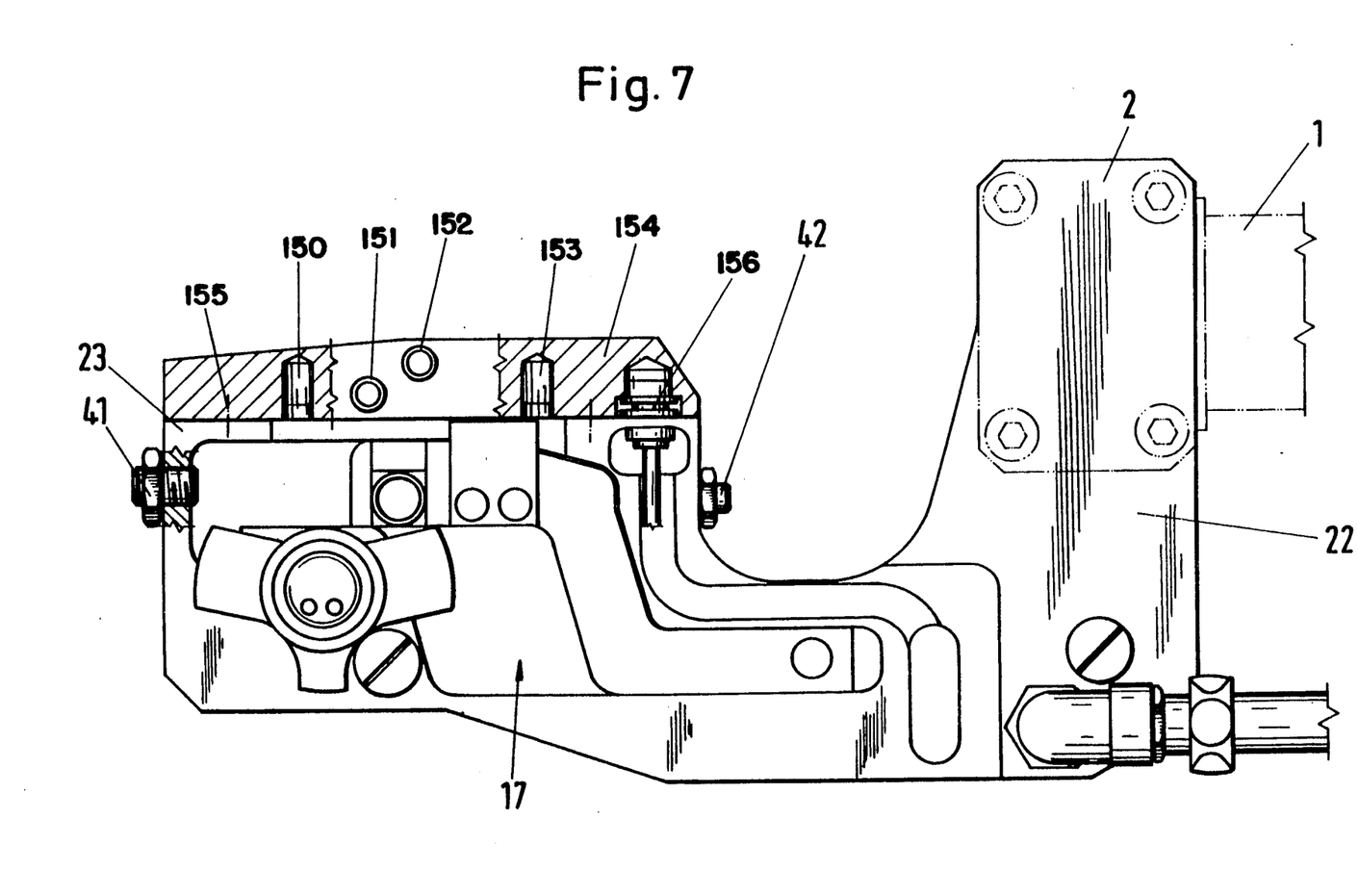
FIG. 7 is a top view of another support embodiment.

The support shown in FIG. 7 corresponds to a large extent to the embodiment of FIG. 3 so that the corresponding components have been identified with the same reference numbers. But while in the embodiment of FIG. 3 the limit switches are built in separately in a lateral part of the support housing 23, the embodiment in FIG. 7 shows a total of four limit switches 150 to 153 in a separate closed housing 154 which is attached to the side of the support housing 23, for example, by means of screws 155. The electrical connection of the limit switches 150 to 153 to the respective activation elements is through a multiphase plug 156. The advantage of this variant lies in the simple exchange possibilities of the limit switches.

The invention is not limited to the embodiment example described above. Both tool grips, for example, can also be arranged at an obtuse angle from one another at the support mount. In addition, there are other possible locking devices of the tool grip in standby position which counteract the drive activated in this position. Finally, while pressurizing, it is possible to lock the tool grip which is in standby position at the time through a special design of the ring ducts and a corresponding arrangement of the connecting bores between the ring duct and the hydraulic cylinders.

I claim:

1. A tool exchanger for programmed machine tools comprising:
   a device for conveyance of selected tools between a tool room and a main spindle of the machine tool;
   a support mounted to the conveyance device;
   a carrier support mount arranged on the support;
   a pair of grip devices arranged in the carrier support mount to move along a prescribed rotation angle for rotating about an axis between an alternate position and at least one standby position; and
   a pair of driving mechanisms for opening and closing the grip devices at the same time, each said driving mechanism including a hydraulic cylinder having a piston rod and a common pressure medium supply ensuring concurrent activation in an open and closed displacement direction;
   the support mount including a locking device which blocks the grip devices in the standby position when the grip devices are closed.

2. The tool exchanger in accordance with claim 1 further including a control element assigned to each tool device and maintained with a prescribed tolerance $\delta$ for actuation by the piston rod.

3. The tool exchanger in accordance with claim 2 wherein the control elements include a cross bar and two laterally tip-stretched side pieces which are longitudinally movable and which are arranged in a slideway parallel to the hydraulic cylinder in the support mount.

4. The tool exchanger in accordance with claim 2 wherein recesses are arranged at the side pieces of the control element which engage an activation pin arranged underneath the grip devices for rotation of the grip devices around fixed hinge pins supported in the support mount.

5. The tool exchanger in accordance with claim 2 wherein the locking device includes a spring-loaded locking bolt which presses slanted locking faces arranged at the side pieces of the control element against locking attachments on the grip devices and wherein the locking device further includes a stop which blocks the piston rod in the standby position after a short withdrawal movement within the tolerance $\delta$ when the locking device is activated in the open direction.

6. The tool exchanger in accordance with claim 3 wherein the locking device includes a spring-loaded locking bolt which presses slanted locking faces arranged at the side pieces of the control element against locking attachments on the grip devices and wherein the locking device further includes a stop which blocks the piston rod in the standby position after a short withdrawal movement within the tolerance δ when the locking device is activated in the open direction.

7. The tool exchanger in accordance with claim 4 wherein the locking device includes a spring-loaded locking bolt which presses slanted locking faces arranged at the side pieces of the control element against locking attachments on the grip devices and wherein the locking device further includes a stop which blocks the piston rod in the standby position after a short withdrawal movement within the tolerance δ when the locking device is activated in the open direction.

8. The tool exchanger in accordance with claim 1 wherein the support mount is rotatable and is arranged on a bolt affixed to the support.

9. The tool exchanger in accordance with claim 8 wherein the locking device includes a housing with two attachments turned in the direction of the standby position and displaced against one another along a double rotating angle, and further including bores arranged for accommodating locking bolts preloaded by one spring package each.

10. The tool exchanger in accordance with claim 1 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

11. The tool exchanger in accordance with claim 2 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

12. The tool exchanger in accordance with claim 3 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

13. The tool exchanger in accordance with claim 4 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

14. The tool exchanger in accordance with claim 5 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

15. The tool exchanger in accordance with claim 6 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

16. The tool exchanger in accordance with claim 7 wherein a pressure medium corresponding to a respective displacement direction is supplied at the same time to both hydraulic cylinders through bores arranged in the support mount, which are connected to two ring ducts arranged in the support mount and in which two pressure medium ducts discharge the pressure medium ducts.

17. The tool exchanger in accordance with claim 1 wherein an adjusting pin is arranged parallel to the rotating axis of the grip devices on a cover affixed to the support mount and which engages a rotating drive.

18. The tool exchanger in accordance with claim 1 wherein an adjusting pin is arranged parallel to the rotating axis of the grip devices on a cover affixed to the support mount and which engages a rotating drive.

19. The tool exchanger in accordance with claim 2 wherein an adjusting pin is arranged parallel to the rotating axis of the grip devices on a cover affixed to the support mount and which engages a rotating drive.

20. The tool exchanger in accordance with claim 3 wherein an adjusting pin is arranged parallel to the rotating axis of the grip devices on a cover affixed to the support mount and which engages a rotating drive.

21. The tool exchanger in accordance with claim 4 wherein an adjusting pin is arranged parallel to the rotating axis of the grip devices on a cover affixed to the support mount and which engages a rotating drive.

22. The tool exchanger in accordance with claim 5 wherein an adjusting pin is arranged parallel to the rotating axis of the grip devices on a cover affixed to the support mount and which engages a rotating drive.

23. The tool exchanger in accordance with claim 6 wherein an adjusting pin is arranged parallel to the rotating axis of the grip devices on a cover affixed to the support mount and which engages a rotating drive.

24. The tool exchanger in accordance with claim 7 wherein an adjusting pin is arranged parallel to the rotating axis of the grip devices on a cover affixed to the support mount and which engages a rotating drive.

25. The tool exchanger in accordance with claim 17 wherein the rotating drive is an angle slide activated by a hydraulic cylinder which is connected to the support mount by means of a guide ring run in a cross groove of the angle slide and by means of the adjusting pin.

26. The tool exchanger in accordance with claim 1 wherein limit switches are arranged in a protective manner in a separate component mounted to a support mount and equipped with a multiphase plug for the electrical connection of the limit switches to corresponding activation elements.

27. The tool exchanger in accordance with claim 1 wherein limit switches are arranged in a protective manner in a separate component mounted to a support mount and equipped with a multiphase plug for the electrical connection of the limit switches to corresponding activation elements.

28. The tool exchanger in accordance with claim 2 wherein limit switches are arranged in a protective manner in a separate component mounted to a support mount and equipped with a multiphase plug for the electrical connection of the limit switches to corresponding activation elements.

29. The tool exchanger in accordance with claim 3 wherein limit switches are arranged in a protective manner in a separate component mounted to a support mount and equipped with a multiphase plug for the electrical connection of the limit switches to corresponding activation elements.

30. The tool exchanger in accordance with claim 4 wherein limit switches are arranged in a protective manner in a separate component mounted to a support mount and equipped with a multiphase plug for the electrical connection of the limit switches to corresponding activation elements.

31. The tool exchanger in accordance with claim 5 wherein limit switches are arranged in a protective manner in a separate component mounted to a support mount and equipped with a multiphase plug for the electrical connection of the limit switches to corresponding activation elements.

32. The tool exchanger in accordance with claim 6 wherein limit switches are arranged in a protective manner in a separate component mounted to a support mount and equipped with a multiphase plug for the electrical connection of the limit switches to corresponding activation elements.

33. The tool exchanger in accordance with claim 7 wherein limit switches are arranged in a protective manner in a separate component mounted to a support mount and equipped with a multiphase plug for the electrical connection of the limit switches to corresponding activation elements.

34. The tool exchanger in accordance with claim 8 wherein limit switches are arranged in a protective manner in a separate component mounted to a support mount and equipped with a multiphase plug for the electrical connection of the limit switches to corresponding activation elements.

35. The tool exchanger in accordance with claim 9 wherein limit switches are arranged in a protective manner in a separate component mounted to a support mount and equipped with a multiphase plug for the electrical connection of the limit switches to corresponding activation elements.

36. The tool exchanger in accordance with claim 10 wherein limit switches are arranged in a protective manner in a separate component mounted to a support mount and equipped with a multiphase plug for the electrical connection of the limit switches to corresponding activation elements.

37. The tool exchanger in accordance with claim 11 wherein limit switches are arranged in a protective manner in a separate component mounted to a support mount and equipped with a multiphase plug for the electrical connection of the limit switches to corresponding activation elements.

38. The tool exchanger in accordance with claim 17 wherein limit switches are arranged in a protective manner in a separate component mounted to a support mount and equipped with a multiphase plug for the electrical connection of the limit switches to corresponding activation elements.

39. The tool exchanger in accordance with claim 25 wherein limit switches are arranged in a protective manner in a separate component mounted to a support mount and equipped with a multiphase plug for the electrical connection of the limit switches to corresponding activation elements.

* * * * *